United States Patent [19]

Heung et al.

[11] Patent Number: 5,411,928
[45] Date of Patent: May 2, 1995

[54] COMPOSITION FOR ABSORBING HYDROGEN

[75] Inventors: Leung K. Heung; George G. Wicks, both of Aiken; Glenn L. Enz, N. Augusta, all of S.C.

[73] Assignee: The United States of America as represented by the United States Department of Energy, Washington, D.C.

[21] Appl. No.: 70,740

[22] Filed: May 24, 1993

[51] Int. Cl.$^6$ ............................................. B01J 20/12
[52] U.S. Cl. ................................. 502/407; 423/248; 423/648.1; 502/405; 502/406
[58] Field of Search ................ 502/407, 406, 405; 423/248, 648.1

[56] References Cited

U.S. PATENT DOCUMENTS

| | | | |
|---|---|---|---|
| Re 14,429 | 1/1918 | Ellis | 502/173 |
| 1,139,592 | 5/1915 | Spieler | 502/173 |
| 2,424,811 | 7/1943 | Freed | 502/173 |
| 3,825,418 | 7/1974 | Reilly et al. | 502/406 |
| 4,036,944 | 7/1977 | Blytas | 423/658.2 |
| 4,110,425 | 8/1978 | Buhl et al. | 423/658.2 |
| 4,321,161 | 3/1982 | Watanabe et al. | 502/407 |
| 4,433,063 | 2/1984 | Bernstein et al. | 423/648 X |
| 4,659,477 | 4/1987 | Macedo et al. | 502/407 |

FOREIGN PATENT DOCUMENTS

| | | | |
|---|---|---|---|
| 0069555 | 1/1983 | European Pat. Off. | 423/248 |
| 0439318 | 7/1991 | European Pat. Off. | |
| 3036834 | 2/1988 | Japan | 502/406 |
| 4-310236 | 11/1992 | Japan | 502/407 |

*Primary Examiner*—Asok Pal
*Attorney, Agent, or Firm*—Brian R. Tumm; Harold M. Dixon; William R. Hoser

[57] ABSTRACT

A hydrogen absorbing composition. The composition comprises a porous glass matrix, made by a sol-gel process, having a hydrogen-absorbing material dispersed throughout the matrix. A sol, made from tetraethyl orthosilicate, is mixed with a hydrogen-absorbing material and solidified to form a porous glass matrix with the hydrogen-absorbing material dispersed uniformly throughout the matrix. The glass matrix has pores large enough to allow gases having hydrogen to pass through the matrix, yet small enough to hold the particles dispersed within the matrix so that the hydrogen-absorbing particles are not released during repeated hydrogen absorption/desorption cycles.

20 Claims, No Drawings

COMPOSITION FOR ABSORBING HYDROGEN

The present invention relates to hydrogen absorption. More particularly, the present invention relates to compositions for absorbing or storing hydrogen. The United States Government has rights in this invention pursuant to Contract No. DE-AC09-89SR18035 between the U.S. Department of Energy and Westinghouse Savannah River Company.

BACKGROUND OF THE INVENTION

1. Field of the Invention
2. Discussion of Background

Hydrogen-absorbing materials are used in many applications, including processes involving the storage, recovery and supply of hydrogen. Industries such as hydrogen processing and energy conversion use such materials in hydrogen purification and separation processes.

Various metals and metal alloys can absorb and then desorb large amounts of hydrogen under appropriate temperature and pressure conditions. These materials are referred to as metal hydrides and are well known in the art. They include pure metals such as Mg, Pd, Ti, Pt, U, and alloys such as those based on nickel, lanthanum and aluminum.

Metal hydrides are used in many different forms. Although frequently used in the form of granules, metal hydrides are sometimes incorporated into a matrix such as a polymer. (See, for example, U.S. Pat. No. 4,110,425, issued to Bühl et al.)

Similarly, porous polymeric matrices are used as media for supporting metal hydrides and other hydrogen-absorbing materials because of the increased surface area and corresponding increase in the amount of hydrogen that can be absorbed in a given volume. Such compositions are disclosed in U.S. Pat. Nos. 4,433,063, issued to Bernstein et al, and 4,036,944, issued to Blytas.

However, current support media for hydrogen-absorbing materials are often insufficient to withstand the rigors of repeated hydrogen absorption/desorption cycles typical of industrial processes. Repeated cycles of absorption and desorption tend to break the hydride particles down into fine powders that compact within the matrix and block gas flow. Also, the powder particles will escape from the support matrix and clog gas lines, filters and other process components.

To eliminate these problems, continuous efforts are being made to develop alternate support media for hydrogen-absorbing materials. Such efforts have led to the production of porous glass materials, particularly porous glass matrices made by sol-gel processes.

Due to their high porosity, sol-gel glasses have very large specific surface areas, an important factor affecting the absorption capacity of hydrogen-absorbing material incorporated into such support matrices. Sol-gels are known as supports for reagents interacting with solutes or other components. Many of such uses are described, for example, in European patent 0 439 318 A2, issued to Avnir et al. However, until recently, sol-gels have never really been adapted for hydrogen-absorbing applications.

Our commonly-assigned and recently-filed U.S. patent application (Ser. No. 07/968,641, filed Oct. 10, 1992) discloses a hydrogen-absorbing composition prepared by a sol-gel process. In that application, a sol is prepared from an organometallic compound, such as tetraethoxysilane, and mixed with hydride particles. The mixture is allowed to polymerize and then to cure to form a highly porous matrix having hydride particles dispersed throughout.

There is a need for a hydrogen-absorbing composition that can perform repeated absorption/desorption cycles without having significant breakdown and consequent release of the hydride particles into the process stream.

SUMMARY OF THE INVENTION

According to its major aspects and broadly stated, the present invention is a composition for absorbing hydrogen. In particular, it is a porous glass matrix, made by a sol-gel process, having a hydrogen-absorbing material dispersed throughout the matrix. A sol, made from tetraethyl orthosilicate, is mixed with a hydrogen-absorbing material and solidified to form a porous glass matrix with the hydrogen-absorbing material dispersed uniformly throughout the matrix. The glass matrix has pores that are large enough to allow gases having hydrogen to pass through the matrix, yet small enough to constrain the particles dispersed within the matrix during repeated hydrogen absorption/desorption cycles.

A major feature of the present invention is the glass matrix. The matrix made according to the present invention is extremely porous and has a very high surface area-to-volume ratio. It is chemically and physically stable and holds the hydride particles securely. Thus, it enables the absorption of large amounts of hydrogen by the hydride over repeated cycles of use.

An important feature of the present invention is the combination of the hydride and the glass matrix.

Other features and advantages of the present invention will be apparent to those skilled in the art from a careful reading of the Detailed Description of a Preferred Embodiment presented below.

DETAILED DESCRIPTION OF A PREFERRED EMBODIMENT

The hydrogen-absorbing composition in its preferred embodiment is prepared by a method generally as follows. First, add ethanol (or alternatively, methanol) to water while stirring to form a first mixture. The ratio of ethanol to water is preferably two to five parts ethanol to one part of water. The mixture is continually stirred for several minutes, preferably for approximately thirty minutes. The acidity of this mixture is adjusted until the pH is in the range 1.0 to 2.5, for example, by adding a few drops of HCl (or alternatively, $H_2SO_4$ or $HNO_3$).

Next, a second mixture is formed by mixing ethanol and tetraethyl orthosilicate, preferably adding the ethanol to the tetraethyl orthosilicate in the ratio of approximately one part ethanol to two parts tetraethyl orthosilicate. As with the first mixture, the second mixture is stirred for several minutes, preferably for thirty minutes.

Next, the first mixture is added to the second mixture, preferably dropwise, stirring continuously, to form a sol. The sol is then covered and allowed to age for approximately 2 to 24 hours, which causes the sol, initially having a water-like consistency, to become viscous.

To the viscous sol is added a measured amount of particles of a hydrogen-absorbing material, preferably the metal hydride $LaNi_{4.25}Al_{0.75}$. The sol is stirred or agitated so that the metal hydride particles are dispersed uniformly throughout. The sol is then allowed to gel with the metal hydride particles suspended throughout the sol-gel.

Alternative metal hydrides include palladium, platinum and various lanthanum-nickel-aluminum alloys. The particle size of the metal hydride to be used is preferably less than approximately 100 μm in size, most preferably approximately 35 μm in size, to better correspond to the pore size of the supporting glass matrix.

Finally, the liquid phase of the gel is removed by using well known, controlled hydrolysis and condensation processes. The gel solidifies into a porous glass matrix.

The final product is a porous glass composition having uniformly dispersed particles of a metal hydride, preferably particles of $LaNi_{4.25}Al_{0.75}$ that are approximately 35 μm in size. Preferably, the pores of the glass matrix are less than approximately 1 μm in size. Thus, the metal hydride particles will be contained and held securely by the glass matrix during repeated cycles of hydrogen absorption/desorption processes even as the particles begin breaking down into smaller particles.

The hydrogen absorption/desorption properties of compositions made by the above process can be seen below. A known amount of the sample composition (using the preferred metal hydride $LaNi_{4.25}Al_{0.75}$) was placed in a stainless steel container and installed on a manifold equipped with supplies of hydrogen gas. When connected to the hydrogen supply, the sample was found to absorb the gas very quickly.

Each kilogram of the glass composite can absorb approximately 1 to 5 g-mole of hydrogen, depending on the composition's ratio of metal hydride to silica in the sample. The formula and test results of a few samples are given:

| Sample number | Silica sol (cc) | hydride added (g) | particle size (μm) | hydride in composite (wt. %) | hydrogen absorbed (g-mole/kg) | hydrogen desorbed (g-mole/kg) |
| --- | --- | --- | --- | --- | --- | --- |
| 1 | 12 | 1.0 | <50 | 54 | 5.0 | 5.0 |
| 2 | 10 | 1.0 | <45 | 54 | 5.0 | 5.0 |
| 3 | 10 | 0.5 | <45 | 27 | 2.5 | 2.5 |

Depending on the materials used and the conditions under which the process steps are carried out, the composition may absorb up to 1% by weight of hydrogen. That is, approximately 200 liters of hydrogen gas (at standard temperature and pressure) per liter volume of glass composite can be absorbed by the composition of the present invention.

It will be apparent to those skilled in the art that many changes and substitutions can be made to the preferred embodiment herein described without departing from the spirit and scope of the present invention as defined by the appended claims.

What is claimed is:

1. A composition for absorbing hydrogen, said composition made by a process comprising the steps of:
   adding a hydrogen absorber to a sol;
   agitating said sol to disperse said hydrogen absorber throughout said sol;
   gelling said sol to form a gel with said hydrogen absorber dispersed throughout said gel; and
   solidifying said gel to form a porous glass matrix with said hydrogen absorber dispersed throughout.

2. The composition as recited in claim 1, wherein said sol is made by the process comprising the steps of:
   mixing ethanol and water to form a first mixture;
   mixing ethanol and tetraethyl orthosilicate to form a second mixture; and
   slowly adding said first mixture to said second mixture to form said sol.

3. The composition as recited in claim 1, wherein said hydrogen absorber further comprises a metal hydride in the form of particles.

4. The composition as recited in claim 1, wherein said hydrogen absorber is selected from the group consisting essentially of lanthanum, nickel, aluminum, platinum, and combinations thereof.

5. The composition as recited in claim 1, wherein said hydrogen absorber is $LaNi_{4.25}Al_{0.75}$.

6. The composition as recited in claim 1, wherein said hydrogen absorber is in the form of particles, each particle being less than approximately 35.0 μm in size.

7. The composition as recited in claim 1, wherein said porous glass matrix has pores less than approximately 1.0 μm in size.

8. A composition for absorbing hydrogen, said composition made by a process comprising the steps of:
   adding particles of a hydrogen absorber to a sol;
   agitating said sol to disperse said particles throughout said sol;
   gelling said sol to form a gel with said particles dispersed throughout said gel; and
   solidifying said gel to form a porous glass matrix.

9. The composition as recited in claim 8, wherein said sol is made by the process comprising the steps of:
   mixing ethanol and water to form a first mixture;
   mixing ethanol and tetraethyl orthosilicate to form a second mixture; and
   slowly adding said first mixture to said second mixture to form said sol.

10. The composition as recited in claim 8, wherein said hydrogen absorber is selected from the group consisting essentially of palladium, platinum, lanthanum, nickel, aluminum, and combinations thereof.

11. The composition as recited in claim 8, wherein said hydrogen absorber is $LaNi_{4.25}Al_{0.75}$.

12. The composition as recited in claim 8, wherein said particles are less than approximately 35.0 μm in size.

13. The composition as recited in claim 8, wherein said porous glass matrix has pores less than approximately 1.0 μm in size.

14. A composition for absorbing hydrogen, said composition comprising:
   a porous glass matrix; and
   particles of a hydrogen-absorbing material dispersed throughout said glass matrix.

15. The composition as recited in claim 14, wherein said material is selected from the group consisting essentially of palladium, platinum, lanthanum, nickel, aluminum, and combinations thereof.

16. The composition as recited in claim 14, wherein said material is $LaNi_{4.25}Al_{0.75}$.

17. The composition as recited in claim 14, wherein said material is a metal hydride.

18. The composition as recited in claim 14, wherein said composition is made by the process comprising the steps of:

mixing ethanol and water to form a first mixture;

mixing ethanol and tetraethyl orthosilicate to form a second mixture;

slowly adding said first mixture to said second mixture to form a sol;

mixing said particles with said sol;

agitating said sol to disperse said particles throughout said sol;

gelling said sol to form a gel with said particles dispersed throughout said gel; and solidifying said gel to form said porous glass matrix.

19. The composition as recited in claim 14, wherein said particles are less than approximately 35.0 $\mu$m in size.

20. The composition as recited in claim 14, wherein said porous glass matrix has pores less than approximately 1.0 $\mu$m in size.

* * * * *